United States Patent [19]
Mitchell

[11] 3,912,229
[45] Oct. 14, 1975

[54] CABLE HAULING SYSTEM WITH HYDRAULIC DIFFERENTIAL

[75] Inventor: Michael D. Mitchell, Bellevue, Wash.

[73] Assignee: Formac International, Inc., Seattle, Wash.

[22] Filed: Feb. 25, 1974

[21] Appl. No.: 445,668

Related U.S. Application Data

[63] Continuation-in-part of Ser. No. 314,841, Dec. 13, 1972, abandoned.

[52] U.S. Cl. ..................... 254/185 AB; 254/185 R
[51] Int. Cl.² ................................... B66D 1/26
[58] Field of Search . 254/183, 184, 185 AB, 185 R; 74/847, 867, 868, 15.2, 720, 687; 60/698, 716

[56] References Cited
UNITED STATES PATENTS

| | | | |
|---|---|---|---|
| 3,282,569 | 11/1966 | Thompson | 254/184 |
| 3,614,066 | 10/1971 | Day | 254/185 |
| 3,643,922 | 2/1972 | Van Der Linde | 254/184 |

*Primary Examiner*—Frank E. Werner
*Assistant Examiner*—Kenneth Noland
*Attorney, Agent, or Firm*—Christensen, O'Connor, Garrison & Havelka

[57] ABSTRACT

An infinitely variable, hydraulically actuated differential mechanism is provided between two winch drums in a cable hauling apparatus. A drive shaft, driven by a prime mover through a torque converter and a variable speed transmission, is coupled to rotatably drive one of the drums. The other drum is driven through a hydraulic motor having a housing and a rotor. The rotor is affixed to the shaft while the housing is journaled on the shaft for rotation about the rotor. The housing is coupled to rotatably drive the second of the two drums. Hydraulic fluid is supplied to the hydraulic motor through a rotating union. When fluid flow through the motor is zero, the rotor of the hydraulic motor will interlock the second of the drums with the first drum. By varying the amount and direction of hydraulic fluid flowing through the motor, rotation of the housing relative to the rotor is effected. The second of the two drums thus can be differentially driven faster or slower than the first of the drums. The hydraulic motor provides both a differential and an interlock mechanism for the two drums of the cable hauling apparatus. In a preferred embodiment, the hydraulic motor is supplied with hydraulic fluid from a hydraulic pump which is directly driven from the prime mover. The drive shaft to which the rotor is affixed is driven by the prime mover through a torque converter and a variable ratio transmission. Through this arrangement of the drive components, the hydraulic differential can be driven at a predetermined design speed independently of drive shaft speed variations caused by torque converter slippage or stall or caused by a change in transmission output ratio.

7 Claims, 7 Drawing Figures

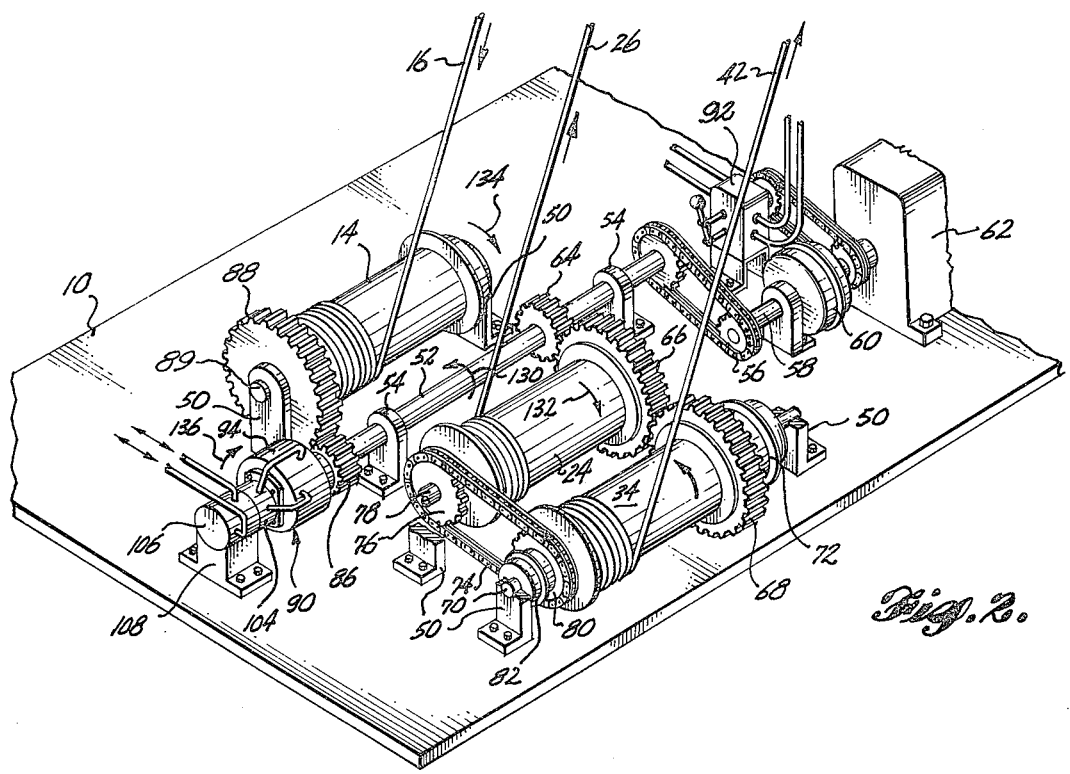
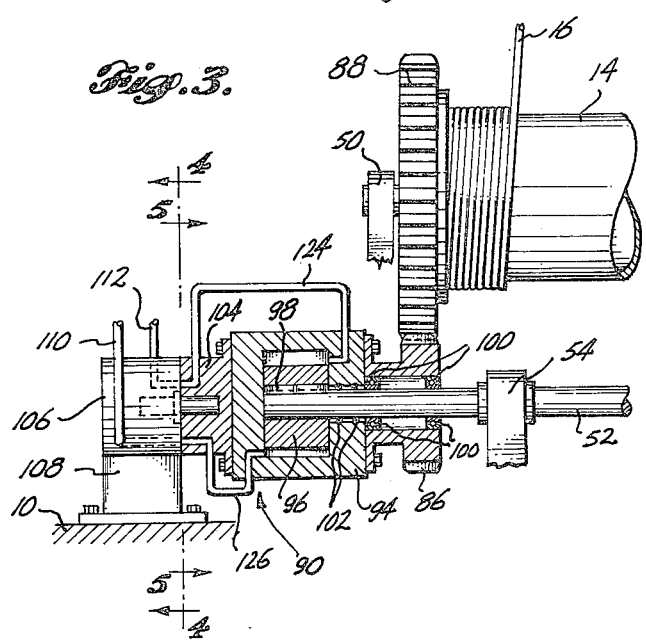
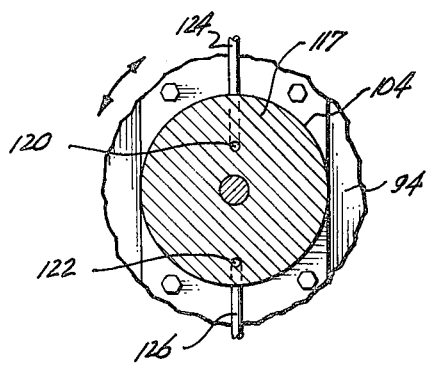
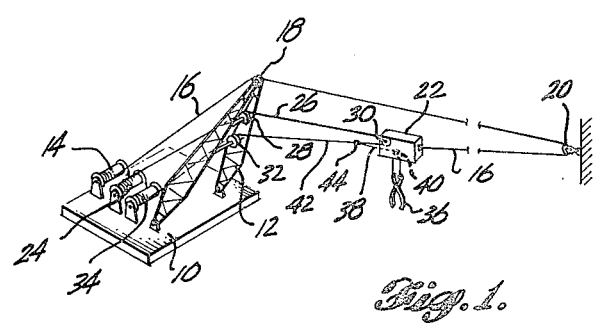

CABLE HAULING SYSTEM WITH HYDRAULIC DIFFERENTIAL

BACKGROUND OF THE INVENTION

This application is a continuation-in-part of the co-pending application, Ser. No. 314,841, filed Dec. 13, 1972, now abandoned.

This invention relates to a fluid coupling and more particularly to an infinitely variable, hydraulic differential and interlock for coupling two drums in a cable hauling system and to a method for operating the same.

In conventional yarding systems, an outhaul cable is wound about an outhaul drum, is threaded through an idler sheave on a boom and extends outwardly to an outhaul block at a remote location from the boom. The outhaul line extends from the outhaul block back to a grapple carriage or other mechanism for grasping and holding a log or turn of logs. An inhaul line is wound about a second drum threaded through an idler sheave in a boom and strung outwardly to the inhaul side of the grapple carriage. The two drums are either counterrotated or the cables wound in opposite directions to haul the carriage from the outhaul block to the boom and back again.

During hauling of the carriage, the effective diameter of the inhaul and outhaul drums vary because of the different number of wraps of cable on each of the drums. This will cause a slackening or tightening of the inhaul cables as the carriage is being hauled. Prior art cable hauling systems compensate for the slackening or tightening of the inhaul and outhaul lines by either slipping drive clutches or by a mechanical differential.

It is desirable in cable hauling, and especially in log yarding, to lower and raise the grapple carriage with respect to the ground so that logs can be picked up from the ground for hauling toward the boom. When the logs reach the boom, the carriage is again lowered to release the logs onto the logging deck. In prior art cable hauling systems utilized for log yarding, the carriage is raised and lowered by tightening or slackening, respectively, the inhaul and outhaul cables. This is accomplished in prior art systems also by either slipping drive clutches or through the use of mechanical differential systems.

When the inhaul and outhaul lines are slackened or tightened by means of slipping drive clutches for one or more of the two drums utilized, imprecise control of line tension is a result. In addition, the clutch surfaces and associated brake surfaces receive a relatively high amount of use and thus wear rapidly. The slipping of clutches to accomplish line tension adjustments has largely been replaced by mechanical differential systems in cable hauling apparatus, and particularly in yarding systems.

One such mechanical differential system is shown and described in the U.S. Pat. 3,282,569 to J. R. Thompson. In the mechanical differential system shown in Thompson, a drive shaft drives the main drum or inhaul drum through a spur gear arrangement. The haulback or inhaul drum is driven through a mechanical differential which is separately controlled for differentially moving the haulback drum with respect to the main drum. The differential mechanism shown in Thompson has a first spur gear driving a first pinion which drives an intermediate pinion in turn journaled on the haulback drum. The intermediate pinion carries planetary gears which mesh with internal teeth on an outer ring gear and with a sun gear. When the ring gear is stationary, the planetary gears will drive the sun gear which is in turn affixed to the haulback drum shaft to drive the haulback drum. The ring gear also contains external teeth which mesh with an independently driven pinion. As the independently driven pinion is rotated in either direction, differential movement of the haulback drum is accomplished with respect to the main drum. This differential system has proven very effective in solving the clutch and brake wear problems as well as providing very precise control of the tension in the inhaul and outhaul lines. A significant disadvantage of the mechanical differential system described is its relatively high cost. In addition, maintenance of the mechanical differential can be quite high since a high number of intermeshing gear surfaces are inherent to the system.

Various drive arrangements using hydraulic differentials have also been suggested. Examples of such arrangements are disclosed in U.S. Pat. Nos. 3,614,066 to Day and 3,733,812 to Lawrence. Both of these arrangements employ a hydraulic motor, the rotor of which is fixed to a drive shaft which in turn drives one of a set of drums. The hydraulic motor housing is constructed to rotate about the rotor and is coupled to drive a second drum of the set of drums. Hydraulic fluid is supplied to the hydraulic motor from a hydraulic pump which is driven by the main drive shaft for the other drum. Thus, as disclosed in both of these patents, the hydraulic pump is subject to the speed variations of the drive shaft.

Neither of these patents recognize the inherent weakness of such speed variations dependency for cable hauling purposes. For example, if the main drive shaft of one of the prior art systems is slowed down, the speed capability of the hydraulic motor differential will also be proportionally slowed. Due to fluid leakage inherent in almost all fluid drive systems, as the hydraulic pump is slowed to a predeterminable speed, for example on the order of less than 50 r.p.m., the motor will become stationary, providing a net differential rotation of zero. As the hydraulic pump is slowed further down and approaches zero fluid output, the drum interlocking capability of the system may be lost entirely as a load on the drums may cause the fluid motor to rotate in the direction opposite to the theoretical direction of rotation. Both of these problems result in a loss of control by the operator of a cable hauling apparatus, and may also result in danger to life and property should there be a load on the hauling apparatus.

Accordingly, it is a broad object of the present invention to provide an improved cable hauling system which employs a hydraulic differential between a set of driven drums. It is a further object of the invention to provide a hydraulic differential which is operable independently of the drive shaft for the drums and which is operable at design speeds regardless of the variable operating speeds at which the drive shaft may be driven. Another object of the present invention is to provide a cable hauling system employing a hydraulic differential and a variable speed transmission which cooperate to provide a multiplicity of variable, differential drive ratios between a set of drums. Specific objects of the present invention are to provide a cable hauling system employing a prime mover which drives a set of drums through a torque converter and a variable speed transmission, in which system the drums are drivingly interconnected by a hydraulic differential, and to provide a means by which fluid can be supplied to the hydraulic differential at a substantially constant rate regardless of the output speed of the torque converter and/or the transmission.

SUMMARY OF THE INVENTION

These objects, and other objects which will become apparent upon reading the following specification, are provided in a cable hauling system which includes a first drum, a second drum and a prime mover. An improvement for coupling the prime mover to differentially drive the first and the second drums comprises a fluid motor means having first and second fluid reactive rotary elements, a drive means coupled to the prime mover to rotatably drive the first fluid reactive elements, a fluid pump means to supply fluid to the fluid motor means, and means for varying the fluid flow through the fluid motor means. The first and second fluid reactive elements are rotatable relative to each other in response to fluid flow through the fluid motor means. The first fluid reactive element is coupled to rotate the first drum while the second fluid reactive element is coupled to rotate the second drum. The drive means includes means for varying the rotational speed at which the prime mover drives the first fluid reactive rotary element. The fluid pump means is directly coupled to the prime mover so as to drive the fluid pump means independently of the rotational speed of the first fluid reactive rotary element. With this improved drive arrangement the prime mover can be operated at a selected output speed while the rotational speed of the first drum is altered without altering the differential rotational speed of the second drum relative to the first drum.

BRIEF DESCRIPTION OF THE DRAWINGS

A better understanding of the present invention can be acquired by reading the ensuing specification in conjunction with the accompanying drawings wherein:

FIG. 1 is a pictorial, isometric view of a log yarding apparatus in which the hydraulic differential and interlock system of the present invention can be utilized;

FIG. 2 is a greatly enlarged pictorial isometric view of a cable hauling drive mechanism incorporating the hydraulic differential and interlock system of the present invention;

FIG. 3 is a crosssectional view of a portion of the hydraulic differential and interlock system of the present invention;

FIG. 4 is a crosssectional view of FIG. 3 taken along section line 44;

FIG. 5 is a partial crosssectional view of FIG. 3 taken along section line 55.

DESCRIPTION OF THE PREFERRED EMBODIMENT

Figure 6:
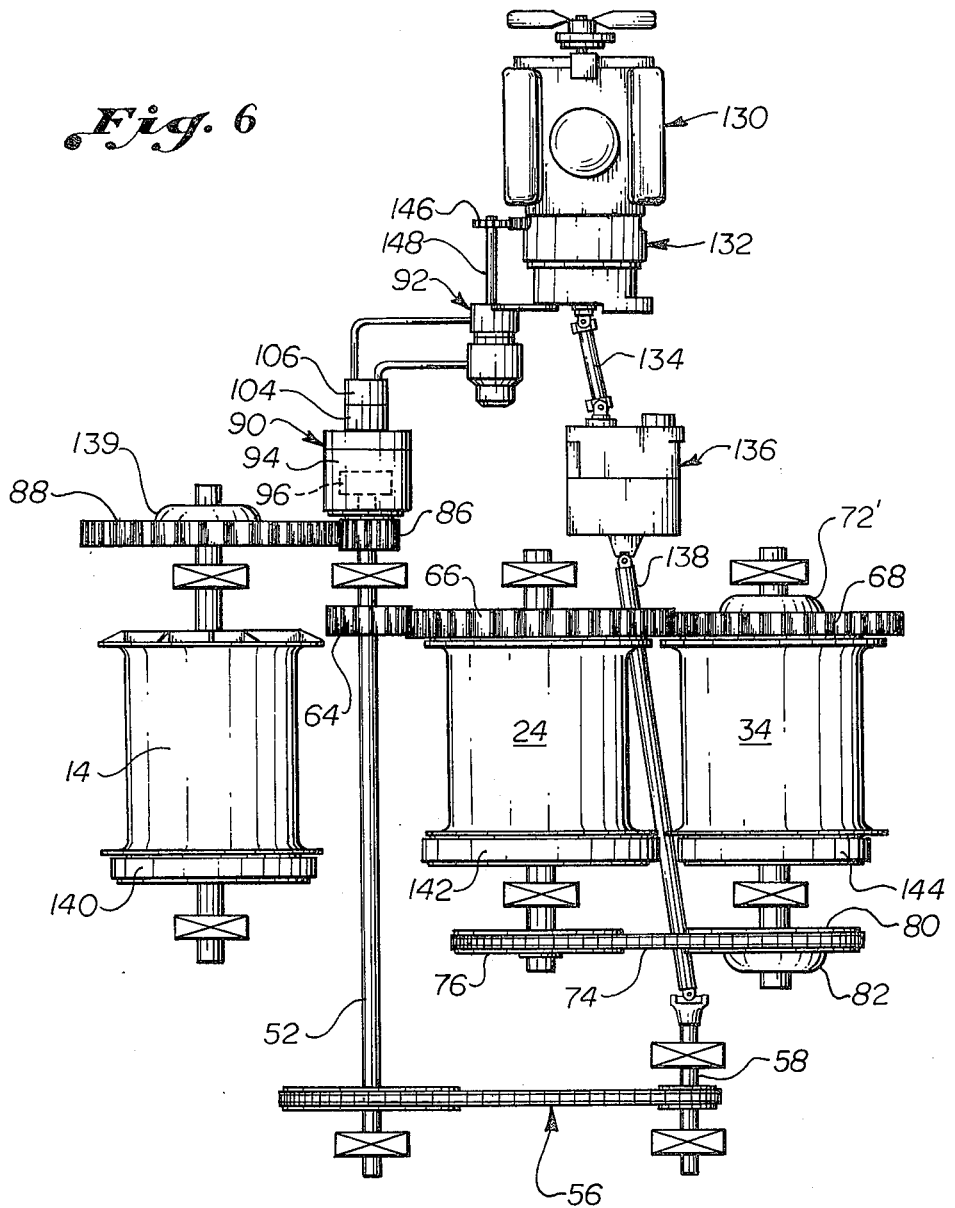
FIG. 6 is a plan view of a preferred embodiment of the cable hauling system of the present invention showing the interconnection of the various drive components with the hydraulic differential and interlock mechanism.

Referring first to FIG. 1, the cable hauling system of the present invention is illustrated in the form of an apparatus used to yard logs. The yarding apparatus includes a platform 10 on which a boom 12 is mounted. A haulback drum 14 is rotatably mounted on the platform 10 and has wound about it an outhaul line 16. The outhaul line 16 traverses an idler sheave 18 mounted on the boom 12 and continues outwardly to a outhaul block. The outhaul block, including a sheave 20, is secured at a location remote from the boom 12 near an area being logged. The end of the outhaul line 16 is connected to a grapple carriage 22. A first main drum 24 is also rotatably mounted on the platform 10. An inhaul line 26 is wound onto the first main drum 24 and traverses an idler sheave 28 rotatably mounted on the boom 12. The inhaul line 26 extends outwardly to the carriage 22 and traverses an idler sheave 30 rotatably mounted in the carriage 22. The inhaul line becomes a grapple operating line 42 after it traverses the sheave 30. The grapple operating line 42 then traverses back toward the boom 12 across an idler sheave 32 rotatably mounted on the boom 12 and is wound about a second main drum (or takeup drum) 34, rotatably mounted on the platform 10. In a conventional manner grapple 36 is suspended from the carriage 22. A grapple actuating line 38 traverses an idler sheave 40 also mounted in the carriage 22 and is connected to the grapple operating line 42 by a clamp 44. By differential rotation of the first and second main drums 24 and 34 with respect to the carriage 22, the grapple actuating line 38 opens and closes the grapple 36. The grapple 36 will grasp a log or turn of logs when the grapple operating line 42 connected to the second main drum 34 is in a slack condition. The carriage 22 is raised and lowered relative to the ground by differential rotation of the haulback drum 14 with respect to the first main drum 24. By providing slack in the inhaul and outhaul lines, 26 and 16, the carriage is lowered. By tensioning the inhaul and outhaul lines, 26 and 16, the carriage is raised in preparation for its traverse between the outhaul block 20 and the boom 12.

FIG. 2 is an enlarged illustration of the platform and cable hauling system as adapted for use in the log yarding apparatus shown in the previous FIGURE. In this embodiment, the haulback drum 14 is journaled in suitable pillow blocks 50 in turn mounted on the platform 10. Likewise, the first main drum 24 and the second main drum 34 are rotatably mounted in suitable pillow blocks 50. A drive shaft 52 is also rotatably journaled on the platform 10 by suitable pillow blocks 54. Drive shaft 52 is rotatably driven by a suitable sprocket and chain drive 56 which is in turn connected to output shaft 58 through a clutch and brake mechanism 60 to a prime mover 62 such as a diesel engine. If desired, clutch and brake mechanism 60 can be omitted and a similar mechanism can be incorporated into the drive gear for each of the drums 14 and 24. A suitable mechanical reversing transmission and torque converter can also be substituted or used in addition to the clutch and brake mechanism as will be explained in greater detail below.

A drive pinion 64 is affixed to drive shaft 52 and meshes with a first main gear 66 affixed to the shaft on which the first main drum 24 is affixed. The first main gear 66 also meshes with second main gear 68 journaled on the shaft on which the second main drum 34 is affixed. The second main gear 68 is connected to drive the shaft when desired through clutch and brake mechanism 72 also mounted on the shaft 70. In addition, the second main drum 34 can be driven through the chain and sprocket drive 74 which includes a first sprocket 76 affixed to the shaft 78 of the first main drum 24 and can drive the second main shaft 70 through a second sprocket 80 disengageably connected to the shaft 70 through clutch mechanism 82.

As can be seen, the outhaul line 16 is wound about the haulback drum 14, the inhaul line 26 is wound about the first main drum 24, and the grapple operating line 42 is wound about the second main drum 34. The inhaul line 26 and the grapple operating line 42 are normally driven together in the same direction by gears 66 and 68 for inhauling and outhauling the lines 26 and 42, thus hauling the carriage 22 and the grapple 36 back and forth between the boom 12 and a remote location. The grapple 36 (FIG. 1) is operated by engaging drive 74, causing lines 26 and 42 to run in opposite directions. Thus, by reversing the direction of rotation of the main drive shaft 52, the actuating line 38, provided in the carriage 22 (FIG. 1), can close and open the grapple 36.

As described above, differential movement is also required between the inhaul line 26 and the outhaul line 16. This is provided through the differential mechanism of the present invention which includes a drive pinion 86 rotatably journaled on the drive shaft 52 and the rotating hydraulic motor, generally designated 90. The pinion 86 drives a large haulback gear 88 which is in turn affixed to the shaft 89 on which the haulback drum 14 is mounted. Hydraulic fluid is supplied to the motor 90 from a conventional variable output hydraulic pump 92. Pump 92 is preferably driven directly by prime mover 62.

Referring to FIG. 3, the hydraulic motor 90 includes a motor housing 94 and a rotor 96 mounted for rotation inside housing 94. A suitable motor which can be utilized in accord with the present invention is of the positive displacement, vane type, rotary hydraulic type. Such motors are available in the prior art and can be adapted for use in the present invention. For example, the MHT 150 series vane motors manufactured and sold by the Mobile Hydraulics Division of Vickers Incorporated, a division of Sperry Rand Corporation, Troy, Mich., can be effectively employed. Since rotary vane type motors are known in the art, the motor is only shown schematically for purposes of disclosing the present invention.

The rotor 96 is fastened to the drive shaft 52 by a suitable fastener such as key 98. Drive pinion 86 is affixed to motor housing 94 by suitable fasteners and is also journaled by suitable bearings 100 on the shaft 52. Thus, the entire housing 94 can rotate about shaft 52 and the rotor 96. Suitable seals 102 are provided between the shaft 52 and the housing 94. A rotating portion 104 of a rotary union is attached by suitable fasteners to the side of motor housing 94 opposite the attachment of the drive pinion 86. A nonrotating portion 106 of the rotary union is affixed by a mounting block 108 to the platform 10.

Referring also to the crosssectional views of FIGS. 4 and 5, hydraulic fluid is supplied by lines 110 and 112 to the nonrotating portion 106 of the union. Annular grooves 114 and 116 provided on face 117 of portion 106 mate, respectively, with the hydraulic lines 110 and 112. The mating face 118 of the rotating portion 104 of the union contains ports 120 and 122 which are in constant communication respectively with the annular grooves 114 and 116. Suitable seals (not shown) are provided between the mating faces 117 and 118 of union portions 104 and 106. As the rotating portion 104 of the union is rotating with respect to the stationary portion 106, hydraulic fluid can be supplied to the ports 120 and 122 at all times. The ports 120 and 122 communicate with hydraulic lines 124 and 126 which in turn communicate with the inlet and outlet ports in the housing 94 of the hydraulic motor. Of course, it is understood that hydraulic fluid can flow in either direction to reverse the direction of rotation of the housing 94 with respect to the rotor 96 in either a clockwise or counterclockwise direction.

Referring back to FIGS. 2 and 3, in operation as shaft 62 is driven in the direction of arrow 130 the first main drum 24 will be driven in the direction of arrow 132. If no fluid is flowing through the hydraulic motor 90, the drive pinion 86 will be locked to rotate in the direction of arrow 130 at the same rotational speed as shaft 52. Thus, the haulback drum will be rotated in the direction of arrow 134. If additional tension in the outhaul line 16 is desired, as to raise the grapple and carriage above the ground, hydraulic fluid is introduced into the housing 94 in a first direction, dependent upon the design of the hydraulic motor, causing the housing 94 to roate in the direction of arrow 130 on the shaft 52. In turn, the haulback drum 14 will be rotated in the direction of arrow 134 at a relative rotational speed greater than that of the first main drum 24. Thus, outhaul line 16 will be drawn onto haulback drum 14 at a rate faster than the inhaul line 26 will be payed out by the first main drum 24. Of course, hydraulic motor 90 can be actuated when the shaft 52 is either rotating or stationary.

If it is desired to decrease the tension in the inhaul and outhaul lines or it is desired to lower the carriage by paying out additional outhaul line 16, fluid is introduced into the housing 94 of the hydraulic motor 90 in a direction opposite to the first, thus causing the housing 94 to rotate in the direction of arrow 136 with respect to the shaft 52. Haulback drum 14 will be taking in less outhaul line 16 than inhaul line 26 being payed out by the first main drum 24. Thus, slack will be supplied in the inhaul and outhaul lines lowering the carriage 22. Of course, hydraulic motor 90 can be actuated when shaft 52 is stationary to pay out or take in outhaul line when the main drum 24 is stationary.

In FIG. 6 the preferred mode of arranging the drive train for the cable hauling system of the present invention is illustrated semischematically in plan view. Parts of this apparatus like those previously described are similarly numbered, although certain of the gears and drive chains have been relocated. For example, the gear set comprising pinions 86 and 88 and the drive chain and sprocket arrangement 56 for the main drive shaft 52 have been moved to opposite sides of the drums, as well as the hydraulic differential 90 and the stationary and rotating portions 106 and 104 of the hydraulic union. A diesel engine 130 is employed as the prime mover. It is understood that any suitable prime mover with a rotating output shaft can be utilized with this embodiment of the invention. The shaft output from the diesel engine 130 is coupled to a torque converter, the housing of which is identified by reference numeral 132. The torque converter at this location in the drive train has several advantages as will become apparent later. The output shaft of the torque converter 132 is coupled by drive shaft 134 to an automatic, variable speed, fluid transmission 136. If desired, a mechanical transmission can be substituted for the automatic transmission 136; however, for most applications the automatic transmission 136 is preferred. The output shaft of the transmission 136 is coupled to a drive shaft 138 to the drive shaft 58, which is in turn rotatably coupled by the chain drive 56 to the main drive shaft 52 of the cable hauling apparatus. Since a fluid coupling and automatic transmission have been utilized, it is not necessary to employ a clutch and a brake mechanism in the main drive train as was done in the previous embodiment. Clutches 72' and 82 are operatively incorporated into the gear 68 and into the sprocket 80 of the chain and sprocket drive which reversibly drive the second main drum from the first main drum. Likewise, a clutch 139 is operatively incorporated into the driven gear 88 on the haulback drum 14. In this embodiment, brakes 140, 142 and 144 are affixed to the sides of the haulback drum 14, the first main drum 24 and the second main drum 34 (take up drum), respectively.

The housing 94 of the hydraulic differential is fixed to the pinion 86 which meshes with the driven gear 88 on the haulback drum. The housing 94 is mounted for rotation on the drive shaft 52 similarly to the previous embodiment. The rotor 96, shown schematically, of the hydraulic differential is fixed to the main drive shaft 52. The hydraulic pump 92 is coupled to the stationary portion 106 of the rotating union by hydraulic fluid lines. Importantly in this embodiment the pump is driven directly by an output shaft 148 in turn driven by the gear set 146. The gear set 146 is driven directly from the diesel engine 130 either from a separate output shaft or from the main output shaft of the engine at a location upstream in the power train from the torque converter 132. In this manner, the fluid output of the hydraulic pump 92 is made independent of the drive train for the cable hauling system downstream of the engine, therefore depending only on the speed of the diesel engine 130. In this embodiment a variable output hydraulic pump 92 of conventional construction is employed to vary the fluid flow in the hydraulic motor 90 so that the differential rotational rate of the housing 94 relative to the rotor 96 can be varied in either direction from zero to its designed maximum rotational speed. That is, the housing 94 can be driven either clockwise or counterclockwise with respect to the shaft 52 to drive the haulback drum 14 at a differential speed relative to the main drum 24.

Driving the hydraulic fluid source directly from the prime mover, rather than downstream in the power train, has several advantages which have neither been recognized nor disclosed in the prior art. These advantages fall into three basic categories. First, driving the hydraulic pump directly from the diesel engine allows differential speed control of the drums independent of the rotational status of the main drive train downstream of the torque converter 132. Second, so driving the hydraulic pump results in an increased differential rotational speed in one drum relative to the main drive shaft 52 as the variable speed transmission 136 is stepped down from the highest gear to the lowest gear, i.e. to the gear providing the main drive shaft with the greatest power at the lowest speed. Third, directly driving the hydraulic pump 92 from the prime mover allows the hydraulic differential to be operated even at low drive train speeds without the use of an auxiliary, variable displacement pump. Specific examples of the utilization of this advantageous arrangement will now be described in various modes of operation of the yarding system.

The first advantage of the preferred embodiment of the cable housing system becomes apparent as the system is being used to inhaul a log or a turn of logs from the loading area adjacent the outhaul block to the staging area adjacent the yarder. Normally a turn of logs is not carried at a great height above the ground during inhaul, but rather is carried near the ground. When the turn of logs encounters an obstacle, or otherwise becomes hung up, the power required by the main drums increases thus reducing the speed of the output shaft of the torque converter due to slippage in the converter. In many instances, the torque converter will install, i.e., the rotational speed of the output shaft becomes zero while the diesel engine is still running at selected operational speeds. In the prior art systems, the hydraulic differential would have been useless for tensioning the lines to raise the turn of logs over the obstacle, since the hydraulic pump is driven downstream of the torque converter. However, in the preferred embodiment of the present invention, the hydraulic pump is still being driven at full speed or other selected operational speed by the diesel engine, allowing the operator of the yarder to provide fluid in the appropriate direction to the hydraulic differential to tension the lines and thus raise the turn of logs over the obstacle. Once the torque converter stalled in the prior art hydraulic differential systems, the only way to free the turn of logs from the obstacle was to disengage the drive clutch to one of the haulback or main drums and independently drive the other of the drums to tension the lines and raise the turn of logs over the obstacle. This procedure requires several control manipulations by the operator including declutching and braking of the nondriven drum while driving the other drum, whereas in the present system a single movement of the hydraulic pump output control is all that is needed to tighten the lines and raise the turn of logs over the obstacle. As soon as the logs clear the obstacle, the torque converter will be relieved from its stall or near stall condition, allowing the turn of logs to continue its journey toward the yarder. For the same reasons, the hydraulic differential can be used in the present system to quickly free the turn of logs before the converter stalls.

The second advantage of the drive arrangement of the present invention occurs when the variable speed transmission is placed in neutral and the operator wishes to drive either the main or the haulback drum. This occurs primarily in a grapple operation when the operator is attempting to position the carriage over a turn of logs in order to attach the grapple to the turn and raise the turn above the ground for traverse. In a grapple operation, the prior art hydraulic drive systems required stopping the carriage in a suspended position above the turn of logs and then spotting the carriage over the logs by slipping or disengaging the clutches on one or both of the main or haulback drums to let the carriage descend. The descent was controlled with the brakes on the main and haulback drums. Longitudinal positioning, that is positioning in the direction of inhaul our outhaul, was accomplished by differentially braking the main and haulback drums. This operation is very jumpy in that it causes alternate tensioning and loosening of the cables, resulting in an overrun of the position of the logs. If an overrun occurred, the operator was required to reengage the main and haulback drum clutches to reposition the carriage over the logs. In the present system, all that need be done is to place the transmission in neutral while the brake on either the main or haulback drum is engaged and thereafter manipulate the control for the hydraulic pump to drive the unbraked drum. For example, the operator can payout line from the haulback drum by engaging the brake on the main drum and driving the haulback drum through the hydraulic differential. By properly controlling the output of the hydraulic pump, the carriage can be precisely positioned over the turn of logs. Alternatively, line can be payed out or taken up from the main drum by applying the haulback drum brake and driving the main drum through the hydraulic motor. By using the hydraulic drive system of the present invention in this manner, the operation is very smooth and requires little operator dexterity.

Also during the grapple operation, the grapple can be opened and closed by placing the transmission in neutral and by applying the haulback drum brake. At the same time, the reversing sprockets between the first and second main drums can be engaged. The first main drum can then be driven through the hydraulic motor to move line 26 and line 42 in opposite directions to operate the grapple through the actuating line 38. The grapple can be opened and closed by merely reversing the fluid flow through the hydraulic motor as desired. Use of the hydraulic differential in this manner results in a much smoother and more precise operation than can be attained by grapple operation through the torque converter.

The third advantage of driving the hydraulic pump 92 directly from the diesel engine is exemplified in operation of the system as a turn of logs approaches the staging area during inhaul. As the turn nears the staging area, the operator wishes to bring the turn closer to the ground while allowing the turn to approach the staging area at the highest possible speed. As the turn of logs approaches the staging area the operator will normally have the transmission in the highest gear, providing the maximum inhaul speed. As the turn nears the staging area, the hydraulic differential will be manipulated to cause line to be payed out from the haulback drum as the main drum is hauling the carriage in, thus lowering the carriage toward the ground. However, due to design limitations in hydraulic differentials, the carriage cannot be lowered from its traverse height to the ground as fast as it is approaching the staging area. To slow the approach of the carriage, the operator normally reduces the inhaul speed by dropping the transmission into a lower gear. As this occurs, the main drive shaft 52 of the cable hauling apparatus will slow down proportionately to the gear reduction in the transmission. In prior art hydraulic differential systems the hydraulic pump speed will be reduced proportionately, making the hydraulic differential ineffective to lower the carriage at a rate faster than the approach speed of the incoming carriage.

Since the hydraulic pump speed in the present invention is independent of the main drive shaft speed, the pump continues to be driven at the same speed as when the transmission is a higher gear, producing a uniform rate of rotation between the housing and rotor of the hydraulic differential. Since the main drive shaft is rotating more slowly and the hydraulic differential can be rotated at uniform speeds independent of the drive shaft rotational speed, the differential rotational speed of the two drums can be increased when the transmission is in lower gear. By using this operational characteristic of the present invention, the operator can smooth and quickly drop the carriage as he changes the transmission ratios to reduce the approach speed of the carriage toward the yarder.

This latter operational characteristic of the invention will be explained by a representative example. Assume that the hydraulic differential has the capability of forward and reverse rotational speeds of 25 r.p.m., that the main and haulback drums are driven at a 1:1 ratio when no fluid is flowing through the differential, and that the main drive shaft directly drives one drum at a speed on the order of 100 r.p.m. when the transmission is in the highest gear and at a speed on the order of 25 r.p.m. when the transmission is in the lowest gear. When the transmission is in the highest gear, the hydraulic differential will provide maximum differential rotation of one of the drums from 75 r.p.m. to 125 r.p.m., resulting in a corresponding outhaul line speed change. When the transmission is changed to low gear, the drum directly driven by the main drive shaft will drop from a speed of 100 r.p.m. to 25 r.p.m. Since the hydraulic pump is still being driven at a speed by the prime mover, the hydraulic differential still has the capability of 25 r.p.m. in either direction. The net result is that one drum can be stopped relative to the other, or can be made to rotate at 50 r.p.m. when the other drum is running at 25 r.p.m. Thus, for purposes of this example, it is seen that the maximum differential speed change when the transmission is in low gear is on the order of plus or minus 100% of the speed of the directly driven drum, whereas the differential speed change when the transmission is in high gear is in on the order of plus or minus 25% of the speed of the directly driven drum.

As outlined above, several other advantages will be apparent to those of ordinary skill in the art. These advantages include ease of mounting of the hydraulic pump since it can be directly driven from a power take-off shaft on the prime mover, and ease of incorporating the present system as an add on accessory to prior art cable housing units. In addition no variable displacement, auxiliary pump is required to make up for the leakage inherent in hydraulic motors, which without the drive arrangement of the present invention would render the hydraulic differential useless at low main drive shaft speeds. Although the present invention has been described in relation to a preferred embodiment of a cable hauling system, it will be recognized by those of ordinary skill in the art that the cable housing system of the present invention has applicability to all systems whereby differential rotation between two drums or rotating bodies is required. After reading the foregoing specification, one of ordinary skill in the art will be able to effect various alterations, substitutions or equivalents, and other changes without departing from the basic concept of the invention. For example, it is contemplated that the arrangement of the rotor 96 and housing 94 can be reversed by fixing the housing 96 to the shaft and journaling rotor 94 on the shaft. Of course, in this alternate embodiment the pinion 86 would still be journaled on the shaft but would be fastened to the rotor. It is therefore intended that the invention be limited only by the definition contained in the appended claims.

What is claimed is:

1. In a cable hauling system including a first drum, a second drum and a prime mover, an improvement for coupling said prime mover to differentially drive said first and second drums comprising:
> fluid motor means including a first fluid reactive rotary element and second fluid reactive rotary element, said first and second elements rotatable relative to each other in response to fluid flow through said fluid motor means, said first fluid reactive rotary element being coupled to rotate said first drum and said second fluid reactive rotary element being coupled to rotate said second drum,
>
> drive means operatively coupling said prime mover to rotatably drive one of said fluid reactive rotary elements of said fluid motor means, said drive means including means for varying the rotational speed at which said prime mover drives said one of said fluid reactive rotary elements,
>
> fluid pump means for supplying fluid to said fluid motor means, said prime mover being directly coupled to drive said fluid pump means independently of the rotational speed of said one of said fluid reactive rotary elements, and
>
> means for varying fluid flow through said fluid motor means.

2. The system of claim 1 wherein said prime mover comprises a rotary output engine and wherein said means for varying the rotational speed of said one of said fluid reactive rotary elements comprises a torque converter.

3. The system of claim 1 wherein said prime mover comprises a rotary output engine, and wherein said means for varying the rotational speed of one of said fluid reactive rotary elements comprises a variable speed transmission.

4. In a method for operating a cable hauling system including a first drum and a second drum, a prime mover, a rotary fluid motor means having a rotor and a housing, said rotor and said housing being capable of relative rotation in response to fluid flow through said fluid motor means, said rotor including means for rotatably driving said first drum and said housing including means for driving said second drum, drive means operatively coupling said prime mover to rotatably drive one of said rotor and said housing, said drive means including speed varying means to alter the rotational speed of said one of said rotor and said housing, and fluid pump means operatively coupled to said fluid motor means to supply fluid to said fluid motor means, the improvement comprising the steps of:
> operating said prime mover at a selected output speed,
>
> altering the rotational speed of at least one of said drums by altering the rotational speed at which said drive means drives said one of said rotor and said housing, and driving the other of said drums at a differential rotational speed relative to said one of said drums by coupling said fluid pump means directly to said prime mover to drive said fluid pump means at a speed proportional to said selected output speed, said speed proportional to said selected output speed being independent of the rotational speed of said one of said drums thereby rendering said differential rotational speed independent of the rotational speed of said one of said drums.

5. The method of claim 4 further comprising the step of:
> varying said differential rotational speed of said other of said drums by varying the amount of fluid supplied to said fluid motor means from said fluid pump means.

6. The method of claim 4 wherein the rotational speed of at least one of said drums is varied by operatively incorporating a torque converter into said drive means and thereafter placing a torque load on said at least one of said drum means.

7. The method of claim 4 wherein the rotational speed of said at least one of said drum means is varied by operatively incorporating a variable speed transmission into said drive means and thereafter varying the speed of the rotational output of said transmission.

* * * * *